A rechargeable battery pack includes a plurality of cell modules connected to each other via bus bars, each cell module including a plurality unit cells with electrode terminals connected to the bus bars, a plurality of spacers between the cell modules, first and second plates coupled to opposite sides of the spacers, the first and second plates being configured to support the cell modules therebetween, and flow paths between the unit cells in a length direction of the unit cells, the flow paths being between side surfaces of the spacers and side surfaces of the unit cells, and being further partially set by sides of the bus bars.

(12) United States Patent
Park et al.

(10) Patent No.: US 10,439,175 B2
(45) Date of Patent: Oct. 8, 2019

(54) RECHARGEABLE BATTERY PACK

(71) Applicant: SAMSUNG SDI CO., LTD., Yongin-si, Gyeonggi-do (KR)

(72) Inventors: Jeong-Kurn Park, Yongin-si (KR); Dong-Rak Kim, Yongin-si (KR); Jong-Rock Choi, Yongin-si (KR); In-Seob Song, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 187 days.

(21) Appl. No.: 14/607,211

(22) Filed: Jan. 28, 2015

(65) Prior Publication Data

US 2015/0249278 A1    Sep. 3, 2015

(30) Foreign Application Priority Data

Feb. 28, 2014 (KR) .................. 10-2014-0024716

(51) Int. Cl.
*H01M 2/10* (2006.01)
*H01M 2/20* (2006.01)
(Continued)

(52) U.S. Cl.
CPC ....... *H01M 2/1016* (2013.01); *H01M 2/1022* (2013.01); *H01M 2/1077* (2013.01);
(Continued)

(58) Field of Classification Search
CPC ............. H01M 10/486; H01M 10/425; H01M 10/482; H01M 10/48; H01M 10/5063; H01M 10/6557; H01M 10/643; H01M 10/6566; H01M 10/613; H01M 2010/4271; H01M 2220/10; H01M 2220/30;
(Continued)

(56) References Cited

U.S. PATENT DOCUMENTS

2011/0039142 A1    2/2011    Kwag et al.
2011/0177373 A1    7/2011    Pellenc
(Continued)

FOREIGN PATENT DOCUMENTS

EP    1986252 A1    3/2008
EP    2624335 A1    12/2012
(Continued)

OTHER PUBLICATIONS

European Search Report dated Jun. 26, 2015.
(Continued)

*Primary Examiner* — Stephen J Yanchuk
(74) *Attorney, Agent, or Firm* — Lee & Morse, P.C.

(57) ABSTRACT

19 Claims, 10 Drawing Sheets (51) Int. Cl.
*H01M 10/643* (2014.01)
*H01M 10/6557* (2014.01)
*H01M 10/6566* (2014.01)
*H01M 10/613* (2014.01)
*H01M 10/6563* (2014.01)

(52) U.S. Cl.
CPC ........... *H01M 2/202* (2013.01); *H01M 2/204* (2013.01); *H01M 2/206* (2013.01); *H01M 10/613* (2015.04); *H01M 10/643* (2015.04); *H01M 10/6557* (2015.04); *H01M 10/6566* (2015.04); *H01M 2/105* (2013.01); *H01M 10/6563* (2015.04); *H01M 2220/20* (2013.01); *H01M 2220/30* (2013.01)

(58) Field of Classification Search
CPC ............. H01M 2220/20; H01M 2/202; H01M 2/1016; H01M 2/1022; H01M 2/1077; H01M 2/204; H01M 2/206
See application file for complete search history.

(56) References Cited

U.S. PATENT DOCUMENTS

| | | |
|---|---|---|
| 2011/0223452 A1 | 9/2011 | Yoshida et al. |
| 2011/0269008 A1* | 11/2011 | Houchin-Miller ........................... B60L 11/1874 429/120 |
| 2013/0122341 A1 | 5/2013 | De Paoli et al. |
| 2013/0316202 A1 | 11/2013 | Bang et al. |
| 2013/0330579 A1* | 12/2013 | Ejiri .................... H01M 2/1061 429/53 |
| 2014/0050966 A1* | 2/2014 | Merriman ........... H01M 2/1061 429/156 |

FOREIGN PATENT DOCUMENTS

| | | |
|---|---|---|
| JP | 11-045691 A | 2/1999 |
| JP | 2008-311130 A | 12/2008 |
| JP | 2011-175896 A | 9/2011 |
| JP | 2013-004468 A | 1/2013 |
| KR | 10-2011-0041873 A | 4/2011 |
| KR | 10-2011-0099979 A | 9/2011 |

OTHER PUBLICATIONS

Office Action dated Apr. 11, 2017, of the corresponding European Patent Application No. 15156936.5.

Extended European Search Report dated Apr. 18, 2018, of the corresponding European Patent Application No. 18154818.1.

* cited by examiner

RECHARGEABLE BATTERY PACK

CROSS-REFERENCE TO RELATED APPLICATION

Korean Patent Application No. 10-2014-0024716, filed on Feb. 28, 2014, in the Korean Intellectual Property Office, and entitled: "Rechargeable Battery Pack," is incorporated by reference herein in its entirety.

BACKGROUND

1. Field

The described technology relates generally to a rechargeable battery pack in which a plurality of unit cells are forced air-cooled.

2. Description of the Related Art

A rechargeable battery is a battery repeatedly charged and discharged, unlike a primary battery. A low-capacity rechargeable battery is used for small portable electronic devices, e.g., a mobile phone, a notebook computer, and a camcorder, and a large-capacity rechargeable battery is used as a power supply for driving a motor, e.g., an electric bike, a scooter, an electric vehicle, a fork lift, or the like.

The rechargeable battery may be used in a single unit cell state. However, in order to implement large capacity, the rechargeable battery may be used in a rechargeable battery pack state, in which a plurality of unit cells are connected in parallel or in series to each other. For example, the rechargeable battery pack may have a structure in which connectors connecting the plurality of unit cells in series or in parallel to each other are used and a current is led from one side connector.

SUMMARY

The described technology has been made in an effort to provide a rechargeable battery pack in which heat in a plurality of unit cells charged and discharged with high power is radiated by a forced air-cooling method.

An exemplary embodiment provides a rechargeable battery pack including a plurality of cell modules connected to each other via bus bars, each cell module including a plurality unit cells with electrode terminals connected to the bus bars, a plurality of spacers between the cell modules, first and second plates coupled to opposite sides of the spacers, the first and second plates being configured to support the cell modules therebetween, and flow paths between the unit cells in a length direction of the unit cells, the flow paths being between side surfaces of the spacers and side surfaces of the unit cells, and being further partially set by sides of the bus bars.

The bus bar may be fixed to a first fastening hole of the spacer by a fastening member.

The spacer may include expansion parts formed in a shape corresponding to a space between four unit cells adjacent to each other in the length direction, and narrow width parts formed in a shape corresponding to a space between two unit cells adjacent to each other in the expansion parts in the length direction, and the first fastening hole is provided in the expansion part in the length direction.

In the flow paths, a stair structure formed in an outer circumferential direction of the unit cell at inner surfaces of the expansion parts and the narrow width parts may be extended in the length direction.

The first and second plates may include lattice members supporting the electrode terminals of the cell module and forming air vent holes connected to the flow paths.

The first and second plates may further include plate members fastened to second fastening holes by the fastening member.

The bus bar may include cell connection parts extended in a direction intersecting with the length direction so as to connect the electrode terminals of the cell module to each other, and module connection parts protruding toward one side of the cell connection part intersecting with an extension direction of the cell connection part and fastened to the first fastening hole of the spacer to thereby connect cell modules adjacent to each other.

The cell connection part may connect the unit cells in parallel to each other in the cell module, and the module connection part may connect the cell modules adjacent to each other in series or in parallel to each other.

A pair of bus bars adjacent to each other may be disposed so as to face each other, a pair of cell connection parts may be disposed in parallel to each other, and a pair of module connection parts may be overlapped with each other and fastened to the first fastening hole by the fastening member.

The cell connection parts may be disposed between the expansion parts in the vicinity of the flow paths to cover the narrow width parts.

The rechargeable battery pack may further include a pair of end plates disposed at both outermost ends of the cell modules, wherein the pair of end plates and the spacers are assembled with each other by fastening nuts to bolts penetrating assembling holes provided at both sides.

The first and second plates may include cell reception parts receiving the electrode terminals of the cell module, and air vent holes formed between four cell reception parts adjacent to each other and connected to the flow paths.

The cell reception parts may include support protrusions supporting outer edges of the electrode terminals of the cell module, and exposure holes formed between four support protrusions adjacent to each other to expose the electrode terminals.

The air vent hole may be formed in protrusion part protruding upwardly from the support protrusion to receive outer side surfaces of the unit cells The spacer may be coupled to some of the protrusion parts of the first and second plates, and the flow path may be set by connecting the air vent holes of the other protrusion parts to each other between the unit cells.

The spacer may include large diameter parts formed at both ends and coupled to the protrusion parts and a small diameter part formed between the large diameter parts.

The bus bar may include cell connection parts extended in a direction intersecting with the length direction so as to connect the electrode terminals of the cell module in two rows, and module connection parts protruding toward one side of the cell connection part intersecting with an extension direction of the cell connection part to connect another cell connection part adjacent thereto.

In the cell connection part, through-holes may be formed in spaces corresponding to spaces between the unit cells to thereby set the flow paths.

In the bus bar, retraction grooves may be further formed in spaces corresponding to spaces between two unit cells adjacent to each other to thereby further set the flow paths.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
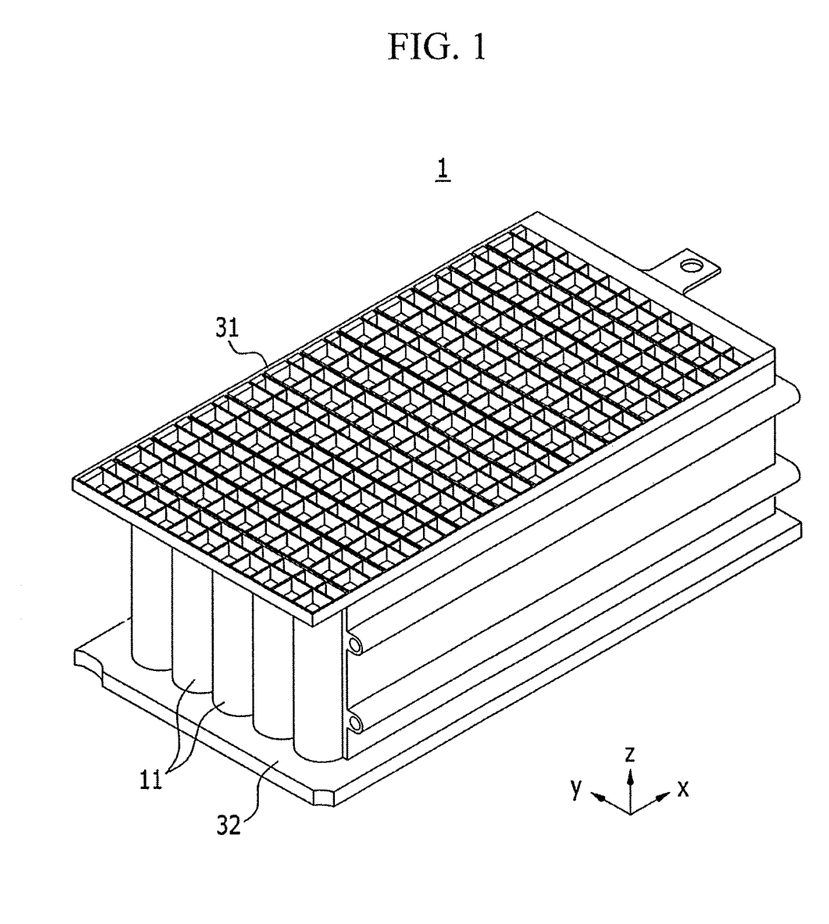
FIG. 1 illustrates a perspective view of a rechargeable battery pack according to a first exemplary embodiment.
Figure 2:
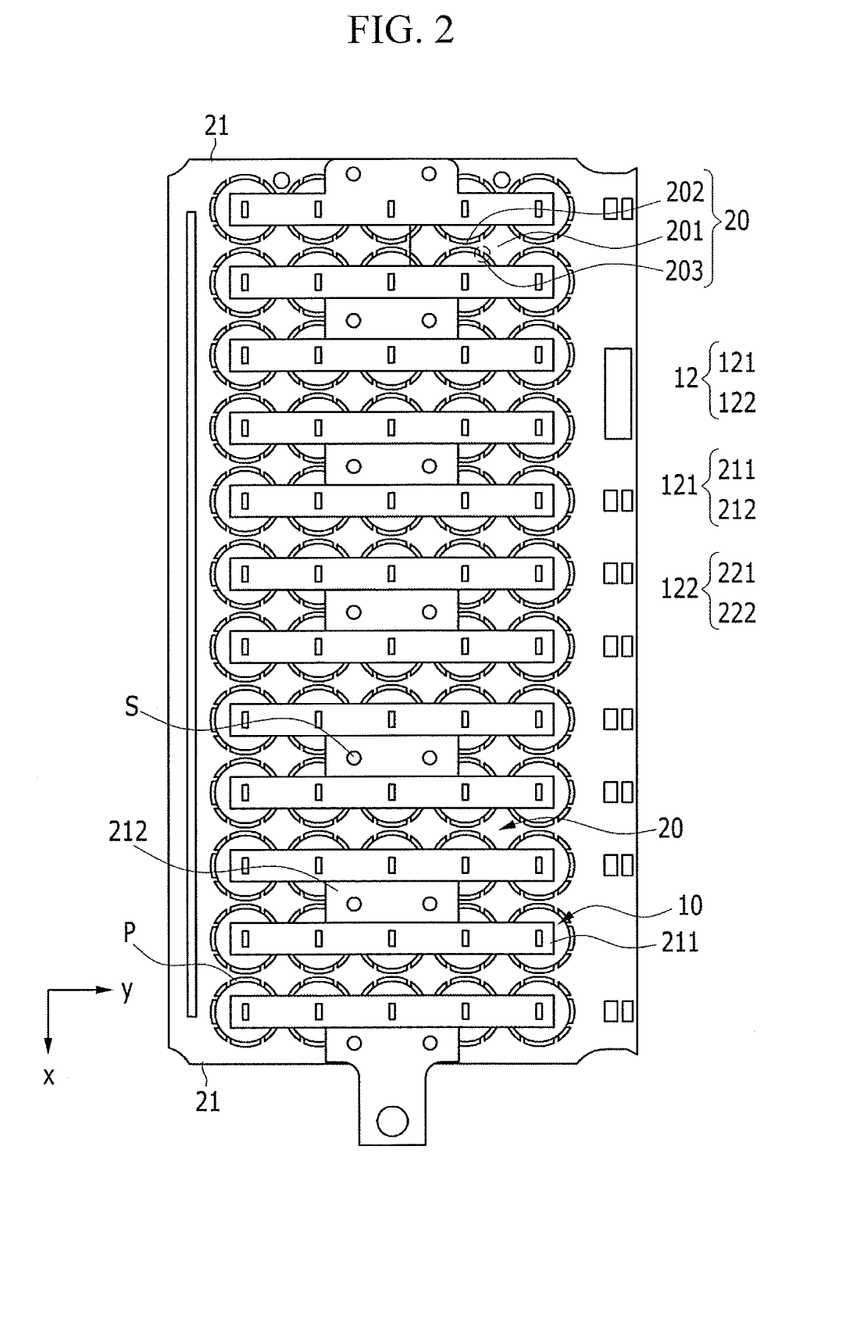
FIG. 2 illustrates a plan view showing a state in which cell modules, spacers, and end plates used in the rechargeable battery pack of FIG. 1 are assembled with each other.

FIG. 1 is a perspective view of a rechargeable battery pack according to a first exemplary embodiment, and FIG. 2 is a plan view showing a state in which cell modules, spacers, and end plates used in the rechargeable battery pack of FIG. 1 are assembled with each other.

Referring to FIGS. 1-2, a rechargeable battery pack 1 according to the first exemplary embodiment may include cell modules 10, spacers 20 disposed between the cell modules 10, a first plate 31, i.e., a top plate 31, and a second plate 32, i.e., a bottom plate 32. The first and second plates 31 and 32 may be coupled to opposite ends of the spacers 20 to support opposite ends of the cell modules 10. For example, the cell modules 10 and the spacers 20 may be alternately arranged on the bottom plate 32, and may be covered by the first plate 31, such that the coupling between the spacers 20 and the first and second plates 31, 32 provides sufficient support to the cell modules 10.

Each cell module 10 may include a plurality of unit cells 11 formed as rechargeable batteries, and may be formed by connecting electrode terminals of the unit cells 11 using bus bars 12. For example, the unit cell 11 in the first exemplary embodiment may be a general cylindrical rechargeable battery repeatedly charged and discharged. In another example, although not shown, the unit cell 11 may be configured as an angular rechargeable battery. For example, although not shown, each unit cell 11 includes an electrode assembly formed by stacking or winding a cathode and an anode while interposing a separator therebetween, a case embedding an electrolyte and the electrode assembly, and a cap assembly coupled to the case in an air-tight structure to thereby be electrically connected to the electrode assembly.

Each spacer 20 may be positioned between two cell modules 10, and may set, e.g., define, a flow path P along the cell modules 10. For example, as illustrated in FIG. 2, the spacer 20 may, e.g., directly, contact each unit cell 11 of the cell module 10, and may further define the flow path P, i.e., a space, between the spacer 20 and each unit cell 11 of the cell module 10, e.g., small portions of the spacer 20 may be spaced apart from an outer surface of the unit cells 11 to define the flow path P along the unit cells 11. A heat medium, e.g., a heat transfer fluid, flows in the flow path P along a length direction, e.g., z axis direction, of the unit cell 11 between the unit cells 11, e.g., along an entire length of the unit cells 11. As illustrated in FIG. 2, the flow path P is set between a side surface of the spacer 20 and side surfaces of the unit cells 11, and is partially further set by at least one side of the bus bar 12. That is, when viewed in the x-y plane of FIG. 2, the flow path P may be partitioned and set per the unit cell 11.

For example, the flow path P may flow a heat medium, e.g., air, forcibly blown by an air blower. Therefore, the flow path P may effectively cool the unit cells 11 by removing heat radiated from the unit cells 11 that are charged and discharged with high power. For convenience, in the first exemplary embodiment, a coupling structure of the rechargeable battery pack 1 and the air blower will be omitted.

Figure 3:
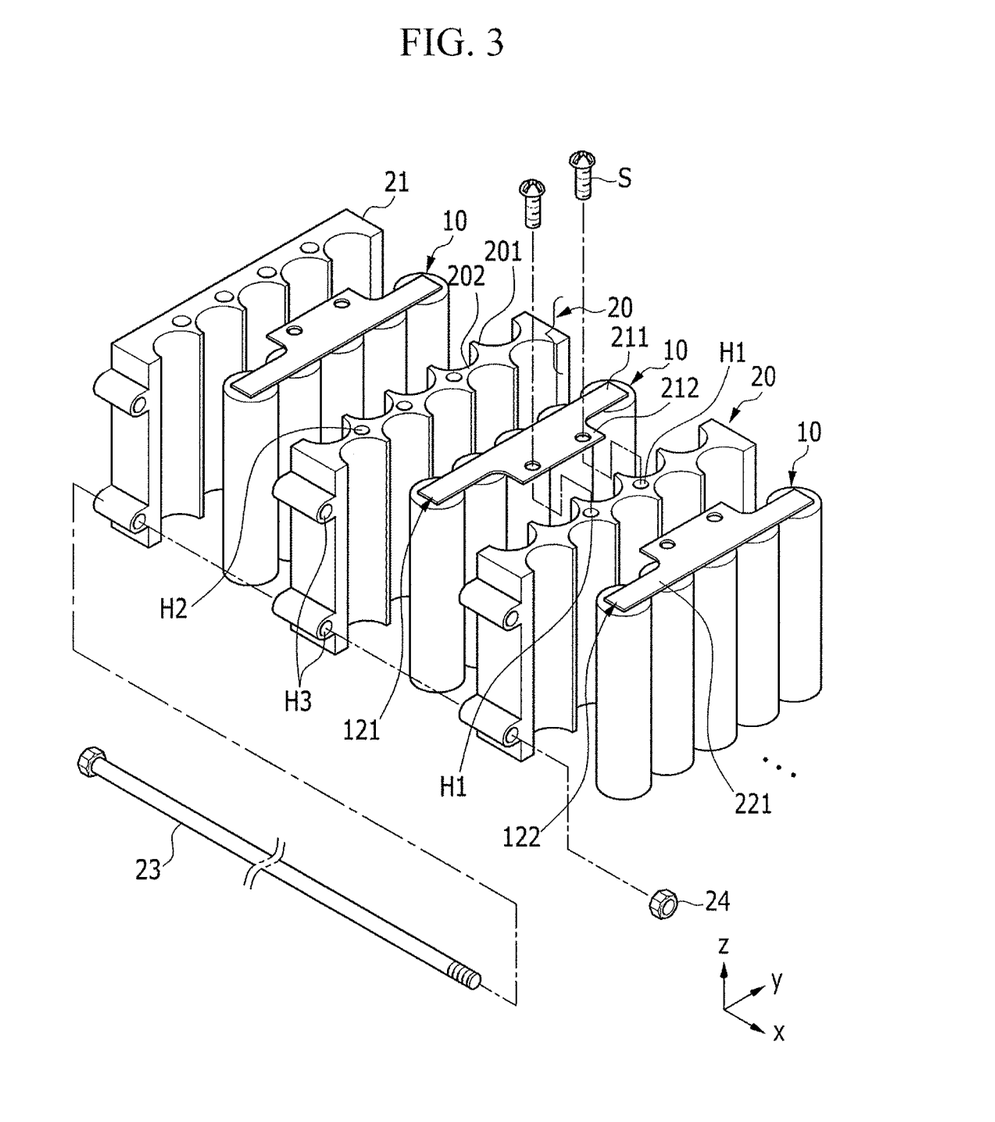
FIG. 3 illustrates an exploded perspective view of the cell module and the spacer used in the rechargeable battery pack of FIG. 1.

FIG. 3 is an exploded perspective view of the cell modules 10 and the spacers 20 of the rechargeable battery pack 1. Referring to FIGS. 2 and 3, the rechargeable battery pack 1 may be formed by installing a pair of end plates 21 (for convenience, a single end plate 21 at one side is shown) at two ends spaced apart from each other in a direction (x direction) in which the cell modules 10 are sequentially disposed. The spacers 20 and the cell modules 10 may be alternately disposed between the pair of end plates 21 along the x axis direction.

Figure 4:
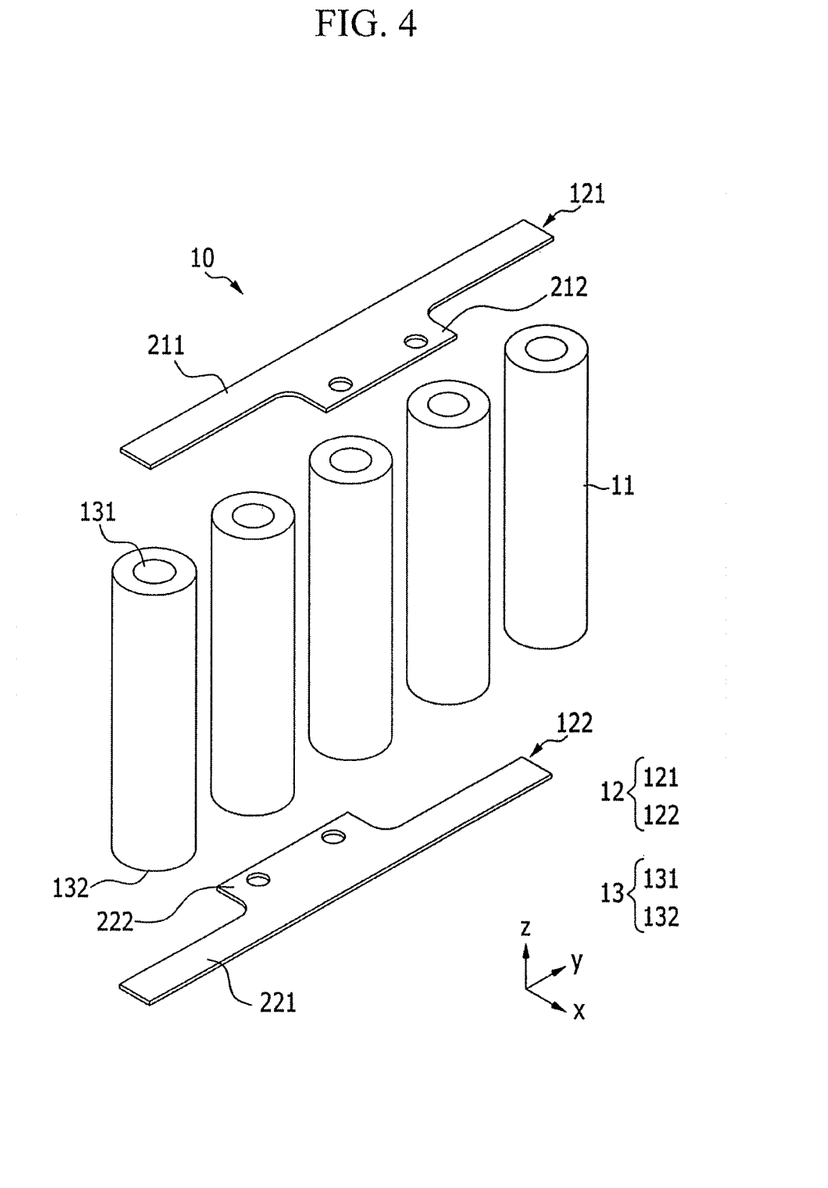
FIG. 4 illustrates an exploded perspective view of the cell module in FIG. 3.

FIG. 4 is an exploded perspective view of the cell module 10. Referring to FIG. 4, the cell module 10 is formed by connecting electrode terminals 13 of, e.g., five, cylindrical unit cells 11 to each other using the bus bar 12. A pair of bus bars 12 may be disposed at upper and lower portions of one cell module 10. That is, a first bus bar 121 is welded to cathode terminals 131 of the unit cells 11 at an upper portion of the cell module 10, and a second bus bar 122 is coupled to anode terminals 132 thereof at a lower portion of the cell module 10. Therefore, five unit cells 11 are connected in parallel to each other in the cell module 10.

The bus bars 12, i.e., the first and second bur bars 121 and 122, are fixed to first fastening holes H1 of the spacer 20 by fastening members S (FIG. 3). Therefore, the cell module 10 and the spacer 20 are coupled to each other via the bus bar 12. The first bus bar 121 includes a cell connection part 211 and a module connection part 212, and the second bus bar 122 includes a cell connection part 221 and a module connection part 222.

Referring to FIGS. 3 and 4, in the first bus bar 121, the cell connection part 211 is extended on top of the unit cells 11 in a direction (y axis direction) intersecting with the length direction (z axis direction) of the unit cells 11 to thereby electrically connect the cathode terminals 131 of the unit cells 11 in parallel to each other. The module connection part 212 protrudes toward one side (in an x axis direction) of the cell connection part 211 intersecting with the extension direction (y axis direction) of the cell connection part 211 to thereby be fastened to the first fastening hole H1 provided at the upper portion of the spacer 20, and connects a pair of cell modules 10 adjacent to each other in series or in parallel to each other.

In the second bur bar 122, the cell connection part 221 is extended on the bottom of the unit cells 11 in the direction (y axis direction) intersecting with the length direction (z axis direction) of the unit cells 11 to thereby electrically connect the anode terminals 132 of the unit cells 11 in parallel to each other. The module connection part 222 protrudes toward one side (in the x axis direction) of the cell connection part 221 in the extension direction (y axis direction) of the cell connection part 221. Although not shown, the module connection part 222 is fastened to the first fastening hole provided in a lower portion of the spacer 20 to thereby connect a pair of cell modules 10 adjacent to each other in series or in parallel to each other.

The cell connection parts 211 and 221 are disposed between expansion parts 201 in the vicinity of the flow path P to cover narrow width parts 202. That is, the first and second bur bars 121 and 122 connect the unit cells 11 while partially setting the flow path P, e.g., a width of the connection part 211 along the x-axis may be smaller than a diameter of a unit cell 11 along the x-axis. Therefore, the first and second bur bars 121 and 122 may maximally secure an area of a portion to which current may flow while not blocking or minimally blocking the flow path P in which the heat medium flows. That is, the unit cells 11 may be charged and discharged with high power.

Referring to FIG. 4, the first and second bus bars 121 and 122 are disposed so as to face each other and to be spaced apart from each other along the z axis direction. For example, as illustrated in FIGS. 2-3, a pair of adjacent cell connection parts 211 along the x-axis may be parallel to each other, and their respective module connection parts 212 extend toward each other to overlap each other. As such, two module connection parts 212 of adjacent cell modules 10 are fastened to the same first fastening holes H1 by the fastening member S. In this case, two cell modules 10 adjacent to each other are connected in series to each other.

Referring to FIG. 3, the spacer 20 includes the expansion parts 201 formed in a shape corresponding to a space between four unit cells 11 adjacent to each other in the length direction (z axis direction), and the narrow width part 202 formed in a shape corresponding to a space between two unit cells 11 adjacent to each other in the expansion part 201 in the length direction (z axis direction). For example, as illustrated in FIG. 2, the expansion part 201 fills a space between four unit cells 11 adjacent to each other in the x and y axes, and the narrow width part 202 fills a space between two unit cells 11 adjacent to each other along the x-axis. For example, as further illustrated in FIG. 2, the expansion parts 201 and the narrow width parts 202 alternate along the y-axis between two adjacent cell modules 10. For example, as illustrated in FIG. 3, the expansion parts 201 and the narrow width parts 202 may be integral, e.g., continuous, with each other, and may extend along the z-axis along an entire length, e.g., height, of the unit cells 11.

The first fastening hole H1 is formed in the expansion part 201 of the spacer 20 in the length direction (z axis direction) of the spacer 20, e.g., the first fastening hole H1 may extend through an entire length of the spacer 20 in the z axis direction. The first fastening hole H1 may allow the module connection parts 212 and 222 of the bur bar 12 to be fixed to the expansion part 201 by the fastening member S.

A stair structure 203 is formed at inner surfaces of the expansion part 201 and the narrow width part 202 to extend in the length direction (z axis direction) of the spacer 20. For example, as illustrated in FIG. 2, the stair structure 203 refers to portions of the spacer 20 that directly contact the unit cells 11, e.g., one such portion is circled by a dashed line in FIG. 2, so the flow path P is defined between such portions of the stair structure 203. Therefore, the flow path P is set between the expansion part 201 and the side surface of the unit cell 11 and between the narrow width part 202 and the side surface of the unit cell 11.

The flow path P is formed in the length direction (z axis direction) so as to form a stair structure in an outer circumferential direction of the unit cell 11. Therefore, the forcibly blown heat medium may effectively radiate heat from the unit cells 11 charged and discharged with high power through the flow path P.

In addition, since the expansion part 201 and the narrow width part 202 support the side surfaces of the unit cells 11 through the stair structure 203, the unit cells 11 may be protected from vibration and impact transferred from the outside, and flows of the unit cells 11 may be prevented. Although not shown, a perforation structure (penetrating in the x axis direction) may be formed in the expansion part 201 and the narrow width part 202 of the spacer 20. In this case, it is possible to implement lightness of the rechargeable battery pack.

Figure 5:
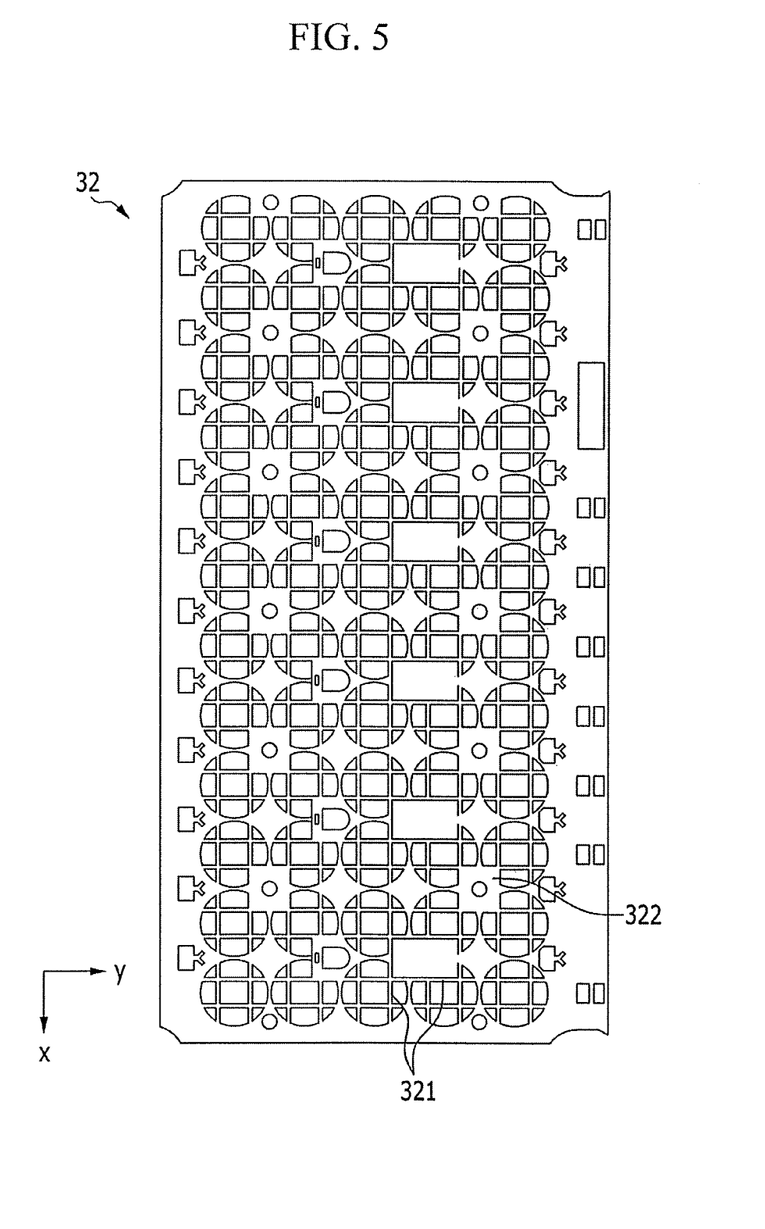
FIG. 5 illustrates a plan view of a bottom plate used in the rechargeable battery pack of FIG. 1.
Figure 6:
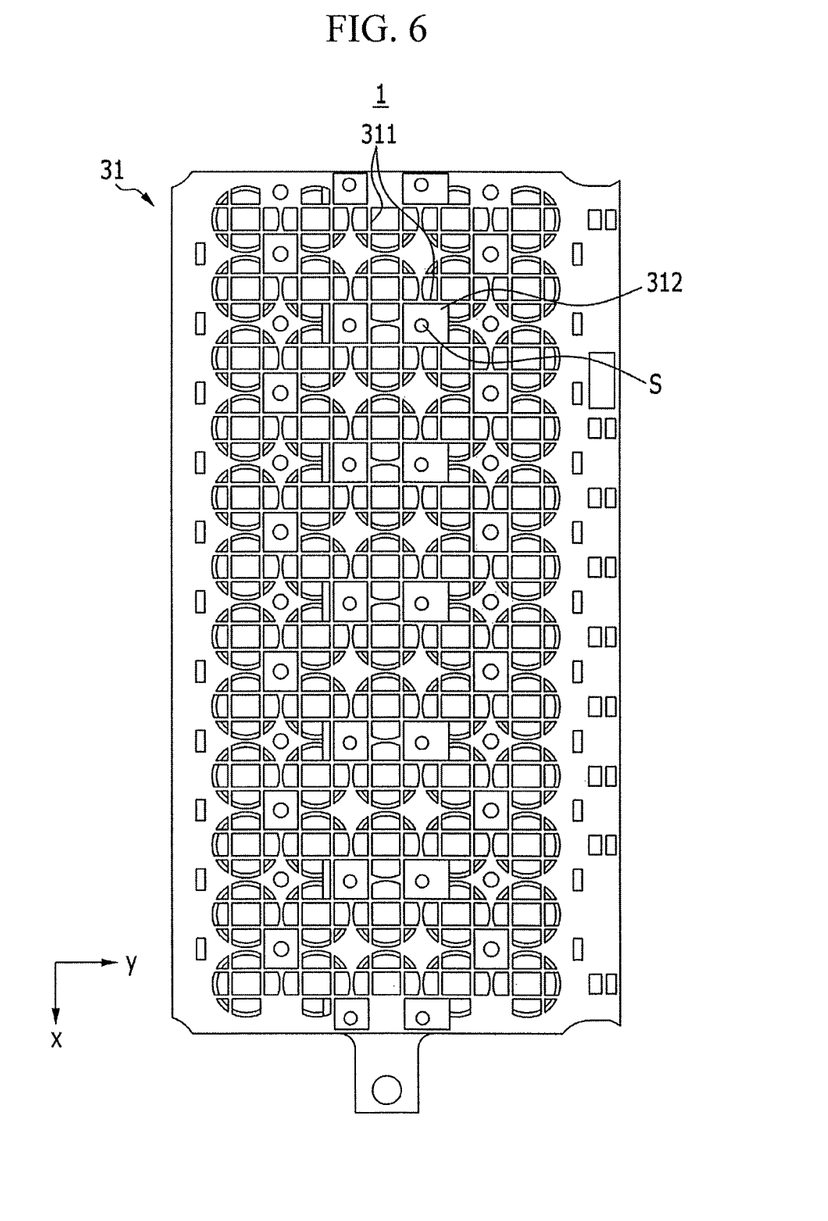
FIG. 6 illustrates a plan view of the rechargeable battery pack of FIG. 1.

Referring to FIGS. 5 and 6, the bottom plate 32 and the top plate 31 include lattice members 321 and 311 coupled to bottom and top surfaces of the spacer 20, respectively, to support the anode terminals 132 and the cathode terminals 131 of the unit cells 11 in the cell module 10, respectively. The lattice members 321 and 311 form, e.g., define, air vent holes connected to, e.g., in fluid communication with, the flow path P. For example, the bottom plate 32 and the top plate 31 may be made of a synthetic resin, which is an electric insulating material.

The bottom plate 32 and the top plate 31 may further include plate members 322 and 312 fastened to second fastening holes H2 of the spacer 20 by the fastening members S. For example, some of the expansion parts 201 of the spacer 20 may include the first fastening holes H1 connected to the bus bars 12, and other expansion parts 201 of the spacer 20 may include the second fastening holes H2 connected to the bottom and top plates 31 and 32 (FIG. 3). In another example, the first and second fastening holes H1 and H2 may overlap.

The plate members 322 and 312 are formed by connecting the lattice members 321 and 311 adjacent to each other at portions corresponding to the second fastening holes H2 provided at both of the upper and lower portions of the spacer 20 to each other. Since the plate members 322 and 312 are formed so as to correspond to the expansion parts 201 as described above, fastening force of the fastening member S may be increased, and the flow path P may be minimally blocked.

A pair of end plates 21 and the spacers 20 may be primarily assembled with each other by inserting bolts 23 into assembling holes H3, as illustrated in FIG. 3. The assembling holes H3 may be formed on lateral sides of the end plates 21 and of the spacers 20, so the assembling holes H3 extend in the x axis direction at first and second sides of the rechargeable battery pack 1, i.e., the first and second sides of the rechargeable battery pack 1 may be spaced apart from each other along the y axis direction and may include the cell modules 10 therebetween. Nuts 24 may be coupled to end portions of the inserted bolt 23, as illustrated in FIG. 3.

The rechargeable battery pack 1 is completed by disposing the bottom plate 32 and the top plate 31 at lower and upper portions of the cell module 10, the spacer 20, and the end plate 21 in a primarily assembled state, respectively, and fixing the plate members 322 and 312 to the second fastening holes H2 with the fastening members S. In this case, since the lattice members 321 and 311 and the plate members 322 and 312 of the bottom plate 32 and the top plate 31 support the upper and lower portions of the unit cells 11, the unit cells 11 may be further effectively protected from vibration and impact transferred from the outside.

Hereinafter, a second exemplary embodiment will be described with reference to FIGS. 7-9. For convenience, descriptions of the same configurations as those in the first exemplary embodiment will be omitted.

Figure 7:
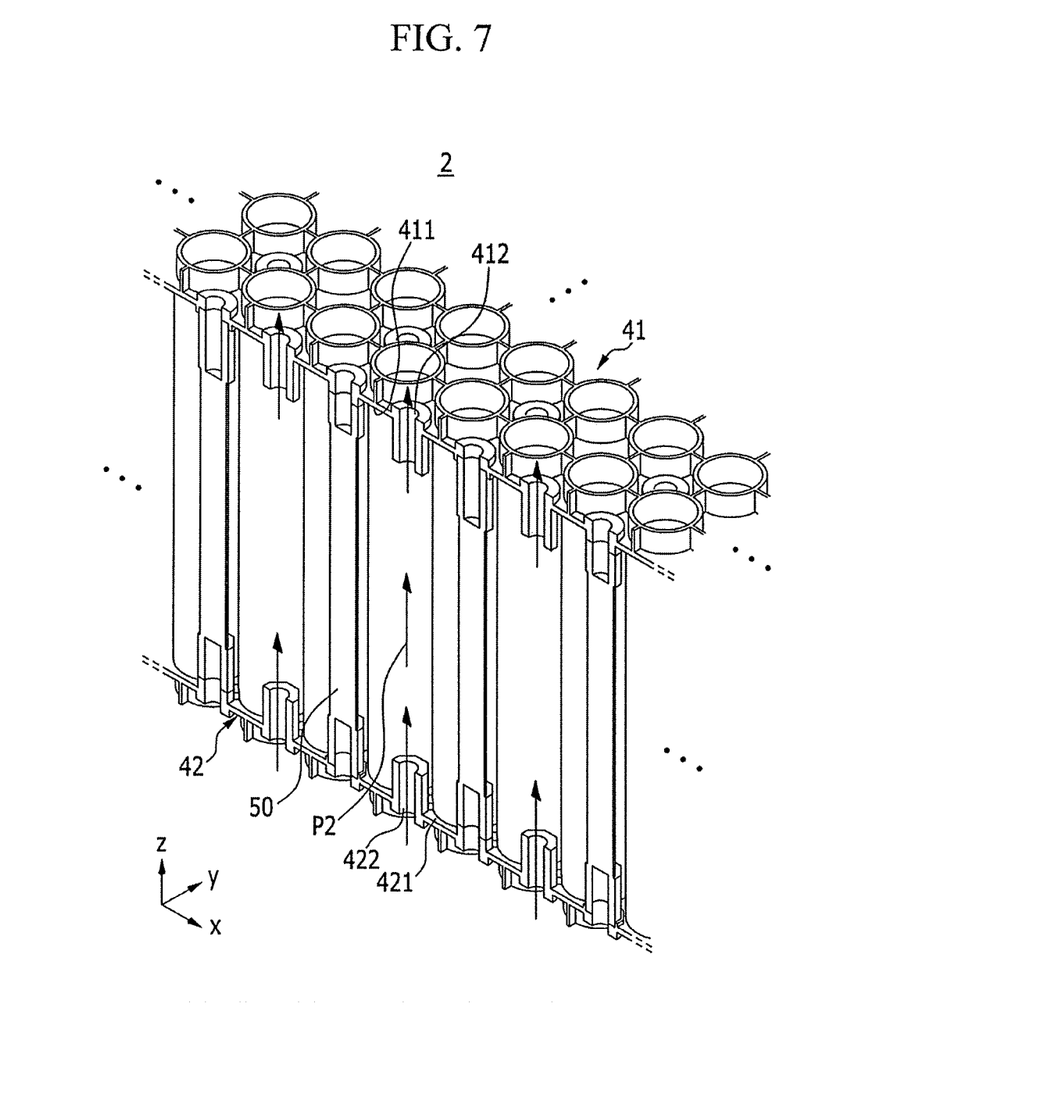
FIG. 7 illustrates a partial perspective view of a rechargeable battery pack according to a second exemplary embodiment.
Figure 8:
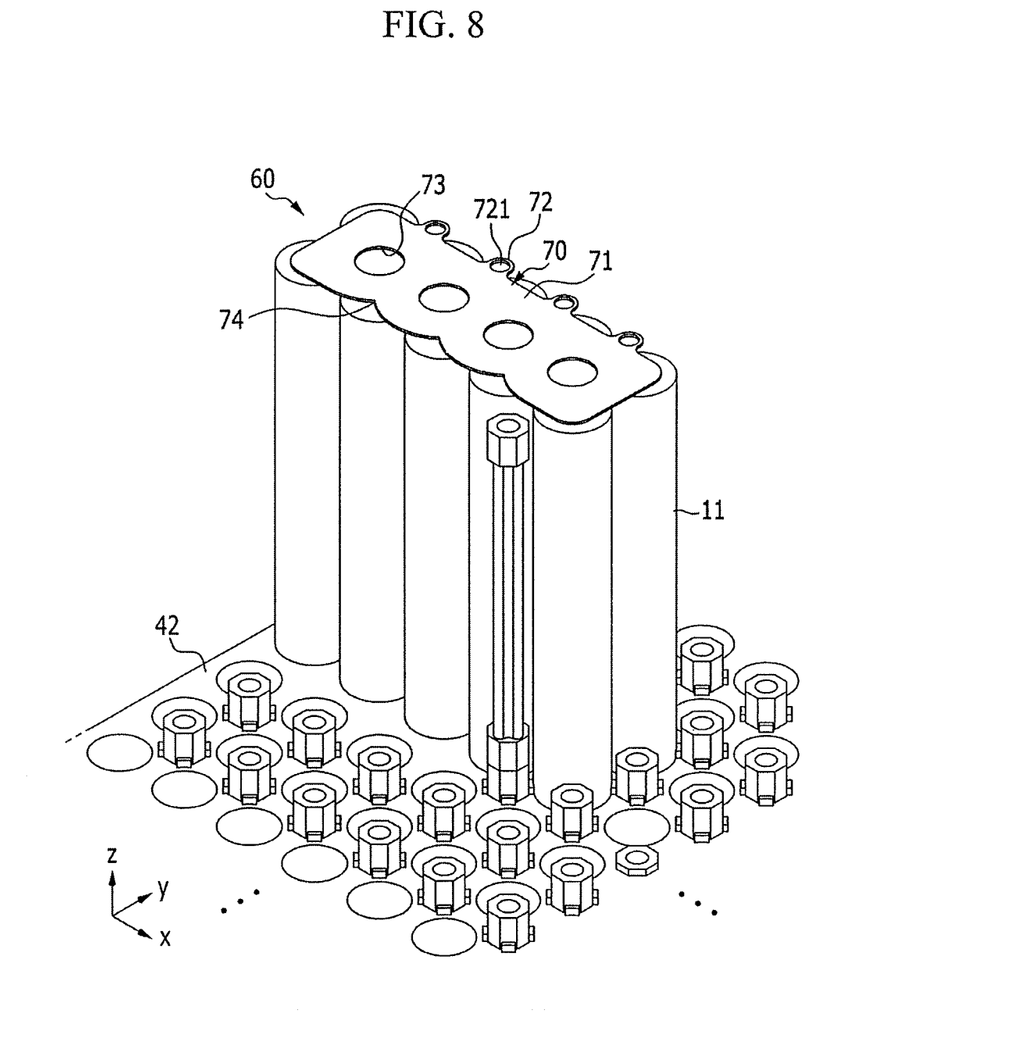
FIG. 8 illustrates a partially assembled perspective view of the rechargeable battery pack of FIG. 7.
Figure 9:
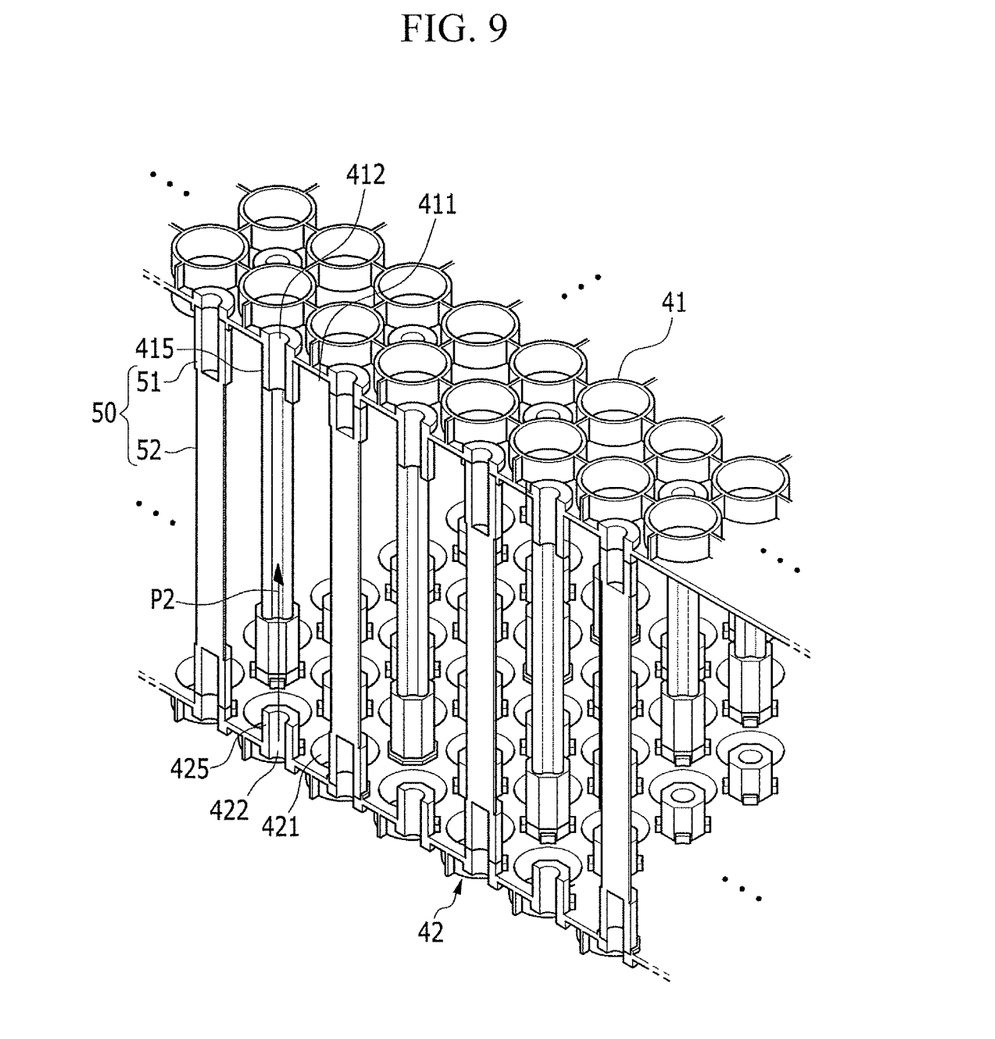
FIG. 9 illustrates a partially assembled perspective view of a bottom plate, a top plate, and spacers used in the rechargeable battery pack of FIG. 7.

FIG. 7 is a partial perspective view of a rechargeable battery pack according to a second exemplary embodiment, FIG. 8 is a partially assembled perspective view of the rechargeable battery pack of FIG. 7, and FIG. 9 is a partially assembled perspective view of a bottom plate, a top plate, and spacers used in the rechargeable battery pack of FIG. 7.

Referring to FIGS. 7 to 9, in a rechargeable battery pack 2, a bottom plate 42 and a top plate 41 include cell reception parts 421 and 411 receiving electrode terminals of a cell module 60 and air vent holes 422 and 412 formed between four cell reception parts 421 and 411 to thereby be connected to flow paths P2.

The cell module 60 may include a plurality of, e.g., ten, unit cells 11 in two rows, and a bus bar 70 connecting the unit cells 11 in parallel to each other in two rows. For convenience, the bus bar 70 shown at an upper portion of the cell module 60 will be described by way of example, but the same bus bar 70 may be provided at a lower portion of the cell module 60 as in the first exemplary embodiment. That is, the bus bar 70 connects the unit cells 11 in parallel to each other in the cell module 60, and different bus bars 70 adjacent to each other connect the cell modules 60 in parallel or in series to each other.

For example, the bus bar 70 includes a cell connection part 71 extended in a direction (x axis direction) intersecting with a length direction (z axis direction) so as to connect the electrode terminals of the cell module 60 to each other in two rows, and module connection parts 72 protruding toward one side (in a y axis direction) of the cell connection part intersecting with the extension direction (an x axis direction) of the cell connection part 71 to connect another cell connection part 71 adjacent thereto.

The cell connection part 71 includes through-holes 73 formed in spaces corresponding to spaces between the unit cells 11 to set the flow path P2. In addition, the bus bar 70 further includes retraction grooves 74 formed at a space corresponding to a space between two unit cells 11 to further set the flow path P2. The module connection part 72 is formed at a side of the bus bar 70 opposite to a side including the retraction grooves 74, and may include penetration holes 721 formed therein to thereby be electrically connect to a module connection part 72 of a bus bar 70 adjacent thereto by a fastening member (not shown) in a state in they are overlapped with each other.

Figure 10:
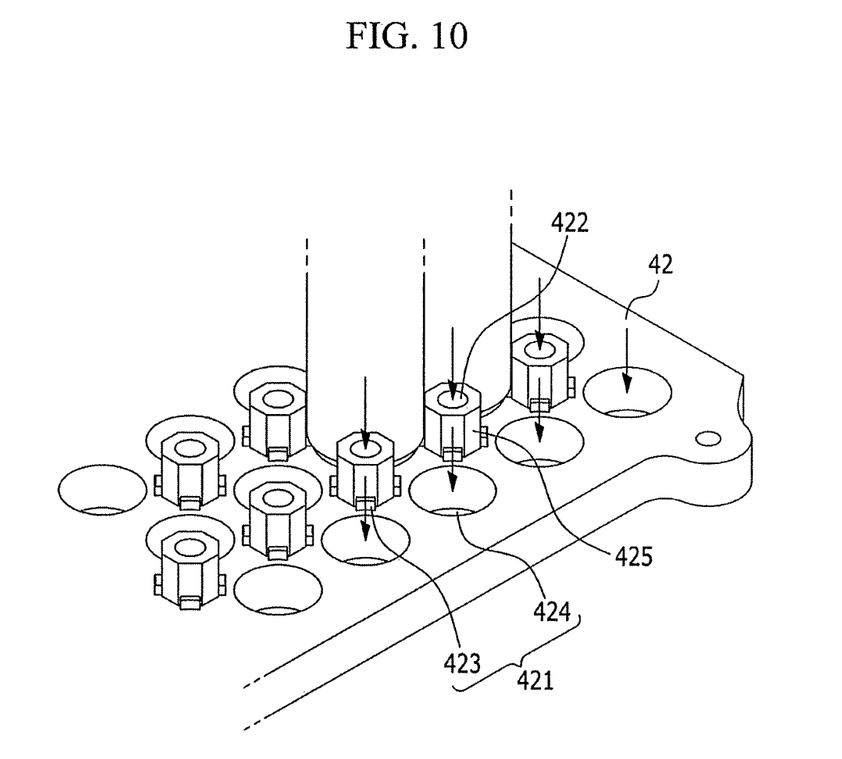
FIG. 10 illustrates a partial perspective view of the bottom plate used in the rechargeable battery pack of FIG. 7.

FIG. 10 is a partial perspective view of the bottom plate used in the rechargeable battery pack of FIG. 7. For convenience, referring to the bottom plate 42, the cell reception part 421 includes support protrusions 423 supporting outer edges of the electrode terminals of the cell module 10 and exposure holes 424 formed between support protrusions 423 adjacent to each other to expose the electrode terminals.

Referring to FIGS. 9 and 10, the air vent holes 422 of the bottom plate 42 are formed in protrusion parts 425 protruding toward upper portions of the support protrusions 423 to receive outer side surfaces of the unit cells 11. The air vent holes 412 of the top plate 41 are formed in protrusion parts 415 protruding downwardly to receive outer side surfaces of the unit cells 11.

Spacers 50 are coupled to some of the protrusion parts 415 and 425 of the top plate 41 and the bottom plate 42 and assembled with the top plate 41 and the bottom plate 42 receiving the unit cells 11 to form the rechargeable battery pack 2. The flow paths P2 are set by connecting the air vent holes 412 and 422 of the protrusion parts 415 and 425 to which the spacers 50 are not coupled among the protrusion parts 415 and 425 between the unit cells 11.

Unlike the flow paths P of the first exemplary embodiment, the flow paths P2 of the second exemplary embodiment are further connected in circumferential directions of the unit cells 11 and are further set between the support protrusions 423 and the unit cells 11 and paths connected to the exposure holes 424. Therefore, heat radiation performance of the unit cell 11 may be further improved, and the rechargeable battery pack 2 may be further lightened.

As illustrated in FIG. 9, the spacer 50 includes large diameter parts 51 formed at both ends so as to be coupled to the protrusion parts 415 and 425 and a small diameter part 52 formed between the large diameter parts 51 and having a diameter smaller than that of the large diameter part 51. That is, the spacer 50 is coupled to the protrusion parts 415 and 425 at grooves formed at ends of the large diameter parts 51. In this case, the unit cells 11 may be spaced apart from the top plate 41 and the bottom plate 42 to thereby be protected from external vibration and impact.

By way of summary and review, when using a plurality of unit cells in a rechargeable battery pack, a rechargeable battery pack should have a structure capable of effectively removing heat generated at the time of charging and discharging the rechargeable battery pack, while also corresponding to high power and being capable of effectively fixing the unit cells to minimize vibration. However, a natural air-cooling rechargeable battery pack structure has low heat radiation performance for unit cells, and it may be difficult to correspond to high power. A water-cooling rechargeable battery pack structure has excellent heat radiation performance for unit cells, but its cost may be increased due to a complicated structure and additional devices.

In contrast, according to example embodiments, a rechargeable battery pack includes spacers between unit cells of a cell module that also define flow paths, and one side of the bus bars further partially sets the flow paths. As such, heat medium may forcibly flow in the length direction of the unit cells along the flow paths, such that heat from the unit cells may be effectively removed.

In addition, since the bus bar may connect the unit cells to each other while setting the flow path, the area of the bus bar may be maximally secured. That is, the unit cells may be charged and discharged with high power. As such, the rechargeable battery pack may correspond to high power and be capable of effectively fixing the unit cells in order to correspond to impact and vibration.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery pack, comprising:
   a first row of a plurality of unit cells in a first cell module with electrode terminals connected to each other via a first bus bar and a second row of a plurality of unit cells in a second cell module with electrode terminals connected to a second bus bar, the first and second rows extending along a first direction;
   a common spacer between the first and second rows, the common spacer including a fastening hole, wherein each of the first and second bus bars includes
      a cell connection part extended in the first direction, the cell connection part connecting the electrode terminals of the unit cells in a respective cell module to each other, and
      a module connection part protruding directly from the cell connection part along a second direction, intersecting the first direction, towards the common spacer to overlap the fastening hole, and to fix a respective bus bar to the fastening hole,
   wherein the first and second bus bars face each other, first and second connection parts are in parallel to each other, and
   first and second module connection parts overlap each other and are fastened to the fastening hole;
   first and second plates coupled to opposite sides of the common spacer, the first and second plates to support the first and second cell modules therebetween; and
   flow paths between the unit cells in a third direction, intersecting the first and second directions, the flow paths being between side surfaces of the spacers and side surfaces of the unit cells, and being further partially set by sides of the first and second bus bars,
   wherein a width of the cell connection part along the second direction is smaller than a diameter of a unit cell and a width of the module connection part along the first direction is larger than the diameter of the unit cell.

2. The rechargeable battery pack as claimed in claim 1, wherein the first and second bus bars are fixed to the fastening hole of the common spacer by a fastening member.

3. The rechargeable battery pack as claimed in claim 2, wherein the common spacer includes:
   expansion parts having a shape corresponding to a space between four unit cells adjacent to each other in two directions, the fastening hole being in the expansion part in the third direction, and
   narrow width parts having a shape corresponding to a space between two unit cells adjacent to each other in the expansion part.

4. The rechargeable battery pack as claimed in claim 3, wherein the common spacer includes a stair structure defining the flow paths, the stair structure being in an outer circumferential direction of the unit cell at inner surfaces of the expansion parts and the narrow width parts and extending in the second direction from inner surfaces to the unit cell, the stair structure extending in the third direction along the unit cell.

5. The rechargeable battery pack as claimed in claim 3, wherein the first and second plates include lattice members supporting the electrode terminals of the cell module and defining air vent holes connected to the flow paths.

6. The rechargeable battery pack as claimed in claim 5, wherein the first and second plates further include plate members fastened to second fastening holes of the common spacer by the fastening member.

7. The rechargeable battery pack as claimed in claim 1, wherein:
   the cell connection part connects the unit cells in parallel to each other in respective cell modules, and
   the module connection part connects the first and second cell modules adjacent to each other in series or in parallel to each other.

8. The rechargeable battery pack as claimed in claim 3, wherein the cell connection part is between the expansion parts in a vicinity of the flow paths to cover the narrow width parts.

9. The rechargeable battery pack as claimed in claim 1, further comprising a pair of end plates at outermost ends of the cell modules, the pair of end plates and the common spacer being assembled with each other by nuts through assembling holes at lateral sides of the common spacer.

10. The rechargeable battery pack as claimed in claim 1, wherein the first and second plates include:
    cell reception parts receiving the electrode terminals of the cell module; and
    air vent holes between four cell reception parts adjacent to each other and connected to the flow paths.

11. The rechargeable battery pack as claimed in claim 10, wherein the cell reception parts include:
    support protrusions supporting outer edges of the electrode terminals of the first and second cell modules; and
    exposure holes between four support protrusions adjacent to each other to expose the electrode terminals.

12. The rechargeable battery pack as claimed in claim 11, wherein the air vent holes penetrate through protrusion parts protruding upwardly from the support protrusion to receive outer side surfaces of the unit cells.

13. The rechargeable battery pack as claimed in claim 12, wherein the common spacer is coupled to some of the protrusion parts of the first and second plates, and the flow paths are set by connecting the air vent holes of the other protrusion parts to each other between the unit cells.

14. The rechargeable battery pack as claimed in claim 13, wherein the common spacer includes large diameter parts at opposite ends and coupled to the protrusion parts and a small diameter part between the large diameter parts.

15. The rechargeable battery pack as claimed in claim 10, wherein the first cell module includes a third row of unit cells with electrode terminals connected to the first bus bar, the second cell module includes a fourth row of unit cells with electrode terminals connected to the second bus bar, and each of the first and second bus bars includes:
    a cell connection part extended in a direction intersecting the third direction and connecting the electrode terminals of the unit cells in a respective cell module in two rows; and
    the module connection part protruding toward one side of the cell connection part and intersecting the cell connection part to connect an adjacent cell connection part.

16. The rechargeable battery pack as claimed in claim 15, wherein the cell connection part includes through-holes in spaces corresponding to spaces between the unit cells.

17. The rechargeable battery pack as claimed in claim 16, wherein each of the first and second bus bars includes retraction grooves defining spaces corresponding to spaces between two unit cells adjacent to each other.

18. The rechargeable battery pack as claimed in claim 1, wherein each of the first and second bus bars extends along unit cells in a single direction.

19. The rechargeable battery pack as claimed in claim 1, wherein the fastening hole is in a center of the common spacer.

\* \* \* \* \*